United States Patent [19]

Dochterman

[11] 4,270,063
[45] May 26, 1981

[54] MOTOR HAVING ADAPTED SHAFT AND SHAFT ADAPTER

[75] Inventor: Richard W. Dochterman, Fort Wayne, Ind.

[73] Assignee: General Electric Company, Fort Wayne, Ind.

[21] Appl. No.: 917,078

[22] Filed: Jun. 19, 1978

[51] Int. Cl.³ .......................... H02K 7/00; E05B 3/00
[52] U.S. Cl. ..................................... 310/66; 292/349; 403/383; 310/67 R
[58] Field of Search ............... 310/40 R, 42, 66, 67 R, 310/75 D, 91, 84, 101, 102 R, 103, 112, 113; 248/604; 417/360, 363; 403/371, 372, 365, 383; 292/349

[56] References Cited

U.S. PATENT DOCUMENTS 1,389,477  8/1921  Beeman ............................... 292/349

FOREIGN PATENT DOCUMENTS 795479  5/1958  United Kingdom ...................... 292/349
1165476 10/1969  United Kingdom ...................... 403/383

OTHER PUBLICATIONS

General Electric Stock Motor Catalog, 2-78, pp. front cover, 17, 40, back Cover. GE Publication GEP-315 A.

Primary Examiner—Mark O. Budd
Attorney, Agent, or Firm—Ralph E. Krisher, Jr.

[57] ABSTRACT

Any suitable strip material, including cold-rolled steel, is stamped to establish first and second laterally extending portions interconnected by a connecting segment, with a locating hole located midway between the free or distal ends of the laterally extending portions. The connecting segment is sized so that no dimension of the connecting segment as measured from the center of the locating hole exceeds a preselected dimension corresponding with the diameter of a shaft with which the adapter is to be used. The central connecting segment may or may not be symmetrically positioned relative to a center reference line extending longitudinally along the laterally extending segments. One or more laterally extending marginal edges of the laterally extending sections may be tapered in order to permit overbending or overforming of the sheet material. The locating hole positions the strip, and the flat material is folded and formed to establish curvature of the laterally extending segments that then extend from the central segment in cantilever fashion. The curvature established corresponds to the curvature of a shaft with which the adapter is to be used. After the tube sector adapter has been formed, it can be readily assembled to a shaft without crimping and may be easily slid manually onto the shaft. The connecting segment positively locates the cantilever segments when the connecting segment bottoms against the shaft. The adapters slip onto the shaft until the connecting segment closely approaches the end of the shaft whereupon finger pressure will seat the adapter on the shaft. Once seated, the tube sector adapter is interlocked with and retained on the shaft, but may also be removed with finger pressure.

3 Claims, 17 Drawing Figures

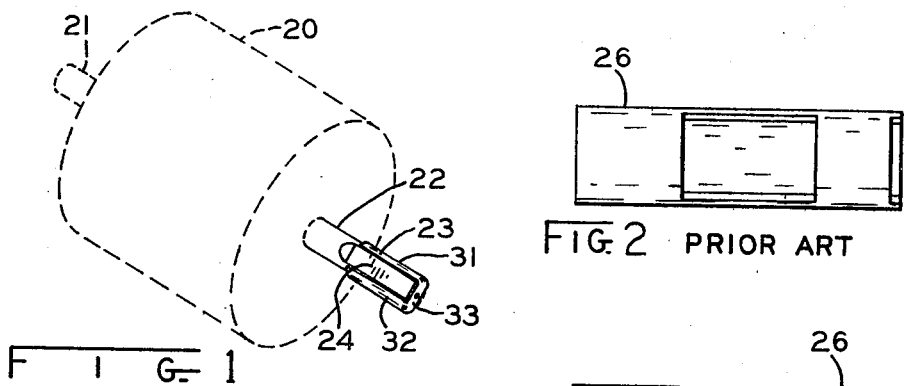
FIG. 1
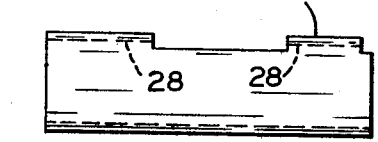
FIG. 2 PRIOR ART
FIG. 3 PRIOR ART
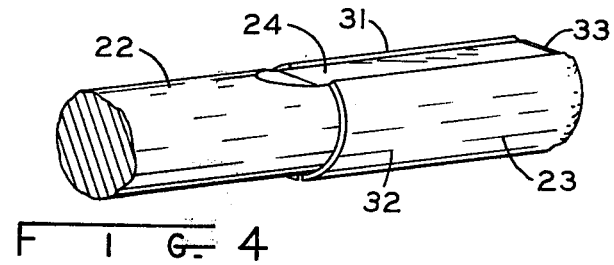
FIG. 4
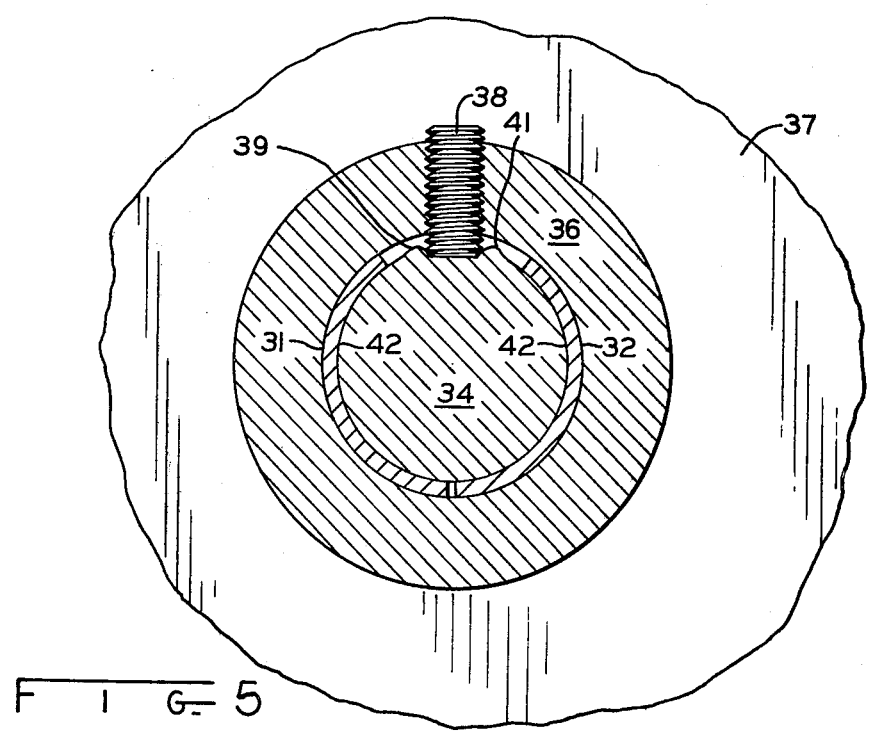
FIG. 5

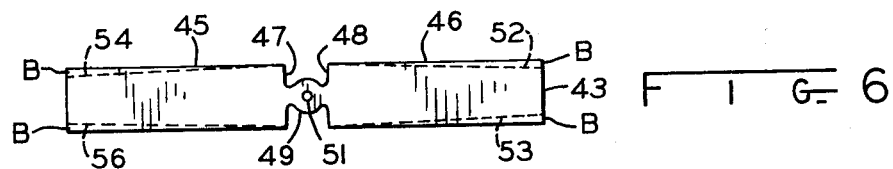
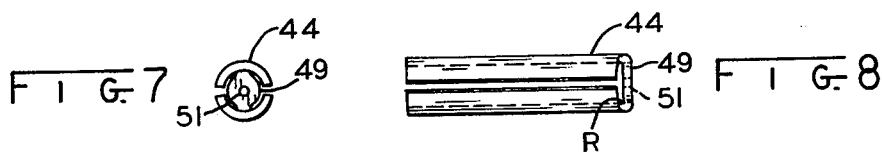
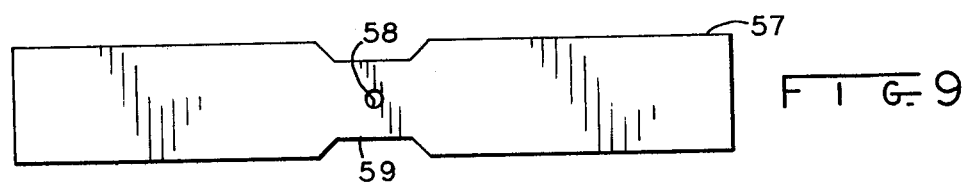
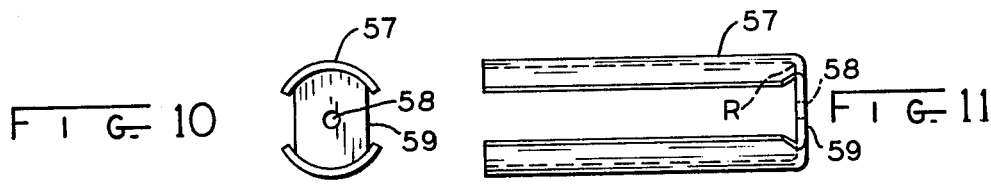
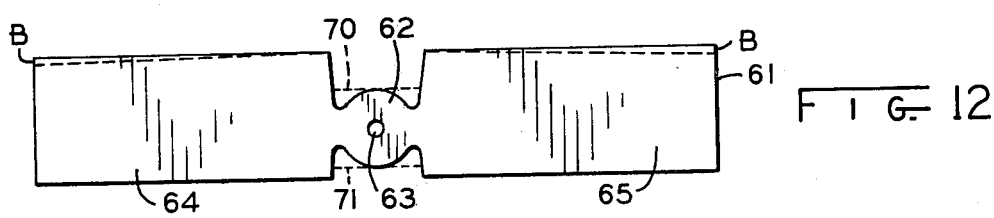
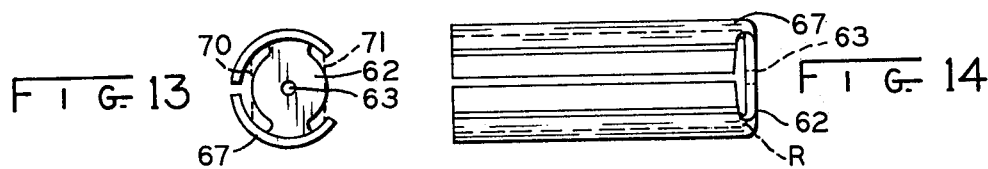
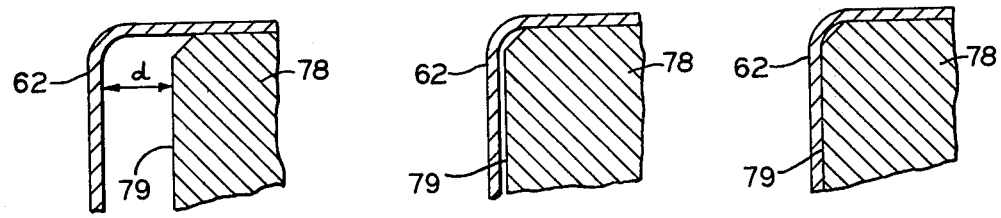

MOTOR HAVING ADAPTED SHAFT AND SHAFT ADAPTER

CROSS REFERENCE TO RELATED APPLICATIONS

The subject matter of this application may be of particular utility in applications of the type described in my copending application Ser. No. 840,263 which was filed on Oct. 7, 1977 as a continuation-in-part of my then copending application Ser. No. 697,547 (filed on June 18, 1976) which issued as U.S. Pat. No. 4,076,197 on Feb. 28, 1978. My applications just referred to in turn contain subject matter that is generally related to the subject matter of Ernest W. Litch U.S. Pat. No. 4,063,060 which issued Dec. 13, 1977. The entire disclosures of the above applications are specifically incorporated herein by reference.

BACKGROUND OF THE INVENTION

The present invention relates generally to motors having shafts adapted to different sizes and, to adapters for motor shafts.

Numerous different manufacturers produce motors that are to be utilized for various applications, including ones where a pulley, blower wheel, or fan is directly attached to the motor shaft. In addition, numerous different manufacturers produce driven devices such as blower wheels, fans, and pulleys which usually are available. Frequently, a situation will arise where it would be most economical for a manufacturer to use a driven device from a first source (or from a pre-existing inventory) and a motor from another source (or from a pre-existing inventory). However, standards do not exist in the industry such that motors of the desired power rating size will invariably have a shaft diameter that will interfit with the bores of all blower wheels or fans which the motor would otherwise be capable of driving. This condition has long existed, and it has become common practice to sell shaft adapters which adapt an undersize motor shaft to driven devices with larger shaft bores.

More specifically, it is common to utilize an adapter which will slide onto a 7.94 mm diameter shaft (5/16 in.) and have a 9.52 mm (⅜ in.) outer diameter. Another common expansion involves the use of adapters to adapt a 12.7 mm (½ in.) diameter motor shaft to a 15.87 mm (⅝ in.) diameter driven device bore.

General Electric Company, the assignee of the present application (as well as the related applications identified hereinabove), for more than a year prior to the filing date of this application, has sold motors and shaft adapters of various configurations. For example, motors and shaft adapters have been marketed wherein the adapter usually has been produced on an automatic screw machine. Typically, these adapters are provided with windows, and a set screw or other fastening device is threaded through the driven device hub, passes through the window, and bears against the motor shaft. Because of the construction of this type of adapter, it is necessary to grind a flat on the motor shaft in order to accommodate any burrs which would be raised by the set screws, and this of course represents an added expense. In addition, if adapters are to be press fit onto the shaft of a motor, equipment and manpower must be expended. On the other hand, if such an adapter is manufactured so that it will easily slide on and off of the shaft, packaging and handling problems are encountered. For example, if loose fitting tubular sleeves are positioned on a motor shaft at time of shipment, the loose fitting sleeves may be easily separated from the motors, and subsequently have to be found and repositioned on the motor shaft. Moreover, when a blower wheel or fan is mounted on such a shaft adapter, time and extra care must be taken to insure that the shaft adapter is properly positioned, not only with respect to the motor shaft but also with respect to the hub of the fan or blower wheel.

In another approach that has been utilized more than a year prior to this application, adapters in the form of coil springs have been used. Typically, such a spring would have a length of about 31.75 mm (1¼ in.), an outer diameter of nominally 9.48 mm (0.373 in.), a nominal inner diameter of 7.95 mm (0.313 in.), and be made from tin plated music wire having a diameter of about 0.76 mm (0.03 in.). While the coil spring type of adapter may be fairly easily threaded onto and off a motor shaft, the expense associated with producing such an adapter is objectionable and the material from which such adapters are produced is also relatively expensive. In addition, spring adapters are not provided with windows through which set screws or other mounting hardware can pass to positively engage the motor shaft.

As another variation, split sleeve shaft adapters have long been used. These adapters are typically 31.75 mm long (1¼ in.) and made from steel or aluminum sheet material 0.78 mm (0.0307 in.) thick. The sheet material is rolled to form a split sleeve or cylinder having an internal diameter that can either be a slip or press fit on a shaft. This type of adapter most typically is used in applications where key ways are formed in the motor shaft, and keys form a positive interlock with a key way in the driven device.

The problems described herein exist in general for both original equipment manufacturers and replacement motor suppliers. For example, replacement motors generally can be stocked much more economically by a distributor, retailer, or service shop if the replacement motor is supplied with a relatively small shaft and one or more adapters which can be utilized to adapt the shaft to one or more preselected larger diameters. This approach provides much more flexibility in using a given motor for a number of different applications.

It should now be understood that it would be desirable to provide motors with adapted shafts wherein the adapters utilized would be sufficiently secured on the shaft to prevent inadvertent dislodgement during packing, handling, and shipping of the motor. On the other hand, it would be desirable that such adapters be readily and easily removable from the shaft without requiring the use of tools or undue amounts of force, and without damage either to the adapter or shaft. It would be particularly desirable to provide adapters that would have the desirable attributes just discussed which would be relatively inexpensive to manufacture, which would utilize inexpensive materials, and which would be manufactured by a process which would be straight-forward and simple in nature but not require the use of exotic materials, equipment, or manufacturing controls. In addition to all of the above, it would be most desirable to provide adapters (as well as methods of attaching the same to motor shafts, and methods of making the same) which could be easily and manually positioned on a shaft, not easily be removed from the shaft inadvertently, which would be positively located on the shaft, and also accommodate a burr raised by a set screw. Among other things, this would eliminate the need to undergo the extra expense associated with grinding a flat on a shaft for the purpose of accommodating a burr raised by set screws or the like. I have now also found that low vibration transmission from a motor to a mounting structure may be related to the fit of a blower hub on a shaft/shaft adapter. Thus, it would also be desirable to provide shaft adapters that would make a minimum contribution to vibration transmissions because of the fit between the shaft and shaft adapter and driven device.

Accordingly, it is a general object of the present invention to provide new and improved motors having adapted shafts, shaft adapters.

It is a more particular object of the present invention to provide a new and improved motor shaft adapter which may be easily positioned by hand on a motor shaft and precisely located on the motor shaft and yet not be easily, inadvertently separated from the motor shaft even though the adapter may be readily removed from the shaft manually.

It is a more specific object of the present invention to provide a new and improved motor shaft adapter that may be easily mounted on a motor shaft manually and yet which will positively interlock with the shaft to insure retention of the adapter on the shaft.

It is a further object of the present invention to provide new and improved shaft adapters whereby commonly available sheet material may be stamped and formed into a configuration that will permit the attainment of the above-mentioned objects.

Yet another object of the present invention is to provide a new and improved shaft adapter that may be manually slipped on a motor shaft and yet be easily removed therefrom, and yet which will accommodate a burr on the shaft without requiring a flat on the shaft.

Still another object of the present invention is to provide a new and improved shaft adapter which can be easily positioned on a shaft, which will establish a positive interlock with the shaft, which can be easily, manually removed from the shaft, and which will represent a minimum contribution to vibration transmission when the motor with the shaft adapter is utilized to drive air moving equipment such as a blower.

SUMMARY OF THE INVENTION

In carrying out the above and other objects of the invention in preferred forms thereof, I select strip metal of any suitable material. When the material selected is common cold-rolled steel, it preferably is selected to be half hard and preferably treated to inhibit corrosion (for example, by phosphatizing). I then stamp the strip to establish first and second laterally extending portions interconnected by a connecting segment, with a locating hole located midway between the free or distal ends of the laterally extending portions. The connecting segment is sized so that no dimension of the connecting segment as measured from the center of the locating hole exceeds a preselected dimension that would correspond with the diameter of the shaft with which the adapter is to be used. In some embodiments, the central connecting segment is centrally located and symmetrically positioned relative to a center reference line extending longitudinally along the laterally extending segments. In other embodiments, the central segment may be offset relative to such reference line.

The locating hole in the central or connecting segment is utilized during manufacture for locating purposes. At the time that the sheet material is being blanked to establish the connecting segment and the laterally extending segments, one or more laterally extending marginal edges of the laterally extending sections may be sheared and tapered in order to permit, during subsequent bending and forming, overbending or overforming of the sheet material.

In preferred forms of practicing the invention, the flat sheet material is folded and formed to establish a tube sector adapter having the laterally extending segments folded so as to extend in generally the same direction from the central segment in cantilever fashion. In addition, the laterally extending segments are formed to establish segments of an arc such that the curvature of the arcuate segments is generally the same as the curvature of the shaft with which the adapter is to be used. After the tube sector adapter has been formed, the two laterally extending segments establish cantilever elements extending from the central segment. Once the tube sector adapter has been formed, it can be readily assembled to a shaft without crimping and may be easily slid manually onto the shaft. The central segment serves as a means for positively locating the cantilever segments when the central segment is bottomed against the end of the shaft. Somewhat surprisingly, when the tube sector adapters are formed as described herein, they will literally slip onto the shaft until the central segment closely approaches the end of the shaft. Thereupon, it takes a slight amount of finger pressure to finally seat the tube sector adapter on the shaft. Once seated, the tube sector adapter is interlocked with and retained on the shaft. However, the tube sector adapter may be easily removed from the shaft by simply applying a small amount of finger pressure to the distal or free ends of the cantilever segments, with the force applied being directed generally colinearly with the direction of the shaft rotational axis.

The subject matter which I regard as my invention is set forth in the appended claims. The invention itself, however, together with further objects and advantages thereof, may be better understood by referring to the following, more detailed description, taken in conjunction with the drawings.

BRIEF DESCRIPTION OF THE DRAWINGS

FIG. 1 is a perspective view of a shaft adapted motor having a tube sector shaft adapter embodying the invention in one form thereof attached to a shaft extension of the motor;

FIG. 2 is a plan view of a prior art shaft adapter;

FIG. 3 is a side elevation of the structure shown in FIG. 2;

FIG. 4 is an enlarged perspective view, with parts removed and parts broken away of the adapted shaft end of the motor of FIG. 1;

FIG. 5 is a cross-sectional view through a motor having a shaft thereof adapted according to the present invention and looking into the hub of a blower wheel that is attached to such shaft;

FIG. 6 is a view of a strip of sheet material that has been contoured in preparation for forming a tube sector adapter embodying the present invention;

FIG. 7 is an end elevation of a tube sector adapter formed from the blank or flat strip of material illustrated in FIG. 6;

FIG. 8 is a side elevation of the structure shown in FIG. 7;

FIGS. 9, 10, and 11 respectively correspond to FIGS. 6, 7, and 8 but differ therefrom in that FIGS. 9-11 illustrate another embodiment of the invention;

FIGS. 12, 13, and 14 respectively correspond to the views shown in FIGS. 6, 7, and 8, but differ therefrom in that FIGS. 12-14 illustrate yet another embodiment of the invention; and FIGS. 15, 16, and 17 illustrate the procedural steps involved in bottoming or seating the central segment of a tube sector adapter such as that shown in FIGS. 13 and 14 on a motor shaft.

DESCRIPTION OF THE PREFERRED EMBODIMENTS

In FIG. 1, I have illustrated in phantom (in order to minimize illustration detail) a shaft adapted motor 20 having a shaft extending from both ends thereof. Although the motor 20 is illustrated with two shaft extensions 21 and 22, it is to be understood that the present invention may be practiced with motors having only a single shaft extension. However, an additional advantage can accrue when utilizing the present invention in applications requiring motors with double shaft extensions. For example, when it is desired to drive from shaft extension 21 a device that is most economically available with a relatively small mounting bore; and to use the shaft extension 22 to drive a device with a relatively large mounting bore, a shaft adapter for extension 22 could be used advantageously. If a conventional prior art shaft adapter were to be used, all of the problems associated with prior art shaft adapters as described hereinabove would be encountered.

As shown in FIG. 1, a tube sector adapter 23 embodying the present invention in one form thereof, is mounted to the shaft extension 22. Since the motor 20 is a conventional motor of the type that has been used heretofore with prior known shaft adapters, the shaft extension 22 is flatted at 24 all as can be seen from both FIG. 1 and FIG. 4. As has been described hereinabove, various prior art approaches have required that flats, such as the flat 24, be provided on the motor shaft so that a burr raised by a set screw will not interfere with removal of the prior art adapter.

One such prior art adapter is shown in FIGS. 2 and 3, and is generally denoted by the reference numeral 26. The shaft adapter 26 has a window 27 formed therein which would be positioned over the flat of a shaft. When a blower wheel, fan, pulley, or other driven device is mounted over a shaft adapter such as the one shown at 26, the mounting screw provided in the hub of the driven device will pass through the window 27, engage the flat of the shaft, and prevent slippage of the driven device relative to the shaft. The set screw or other fastening means used for this purpose, usually will raise a burr along the shaft. Such burr would then project into the window 27 of the prior art adapter 26 if the shaft were not flatted, and prevent removal of the adapter from the shaft.

With reference once again to FIGS. 1 and 4, it will be noted that the tube sector adapter 23 includes first and second laterally extending segments or portions 31, 32 which extend in cantilever fashion from the central or connecting segment 33. The connecting segment 33 is bottomed against the end of the shaft extension 22 and thus precisely locates the tube sector adapter 23 on the shaft 22.

FIG. 5 shows a somewhat modified construction wherein a tube sector adapter identical to the tube sector adapter 23 (and thus denoted with the same reference numerals) is mounted on a shaft extension 34 which does not have a flat thereon. Mounted over the tube sector adapter in FIG. 5 is the hub 36 of a blower wheel 37. As will be understood from a review of FIG. 5, a set screw 38 is threaded through the hub 36, between the laterally extending cantilever segments 31, 32, and into engagement with the outer peripheral surface of the shaft 34. As the set screw 38 is tightened in order to prevent slippage of the blower wheel 37 relative to the shaft 34, a burr is raised as indicated at 39, 41. Even though the burr 39, 41 extends radially beyond the imaginary bore that would be established by a continuation of the interior bore surface 42 of the tube sector adapter, the tube sector adapter can nonetheless be readily removed from the shaft 34 without interfering with the burr. On the other hand, if a prior art adapter such as that shown in FIGS. 2 and 3 were mounted on shaft 34, the burr 39, 41 would prevent easy removal of the prior art adapter.

FIGS. 6, 9, and 12 illustrate four other configurations of sheet material that may be foled and formed to establish tube sector adapters embodying the present invention. For example, FIGS. 6, 7, and 8 illustrate how a sheet material blank 43 may be folded and formed to establish a tube sector adapter 44 sized to adapt a 3.17 mm (⅛ in.) diameter shaft to a 4.76 mm (3/16 in.) diameter drive application. The blank 43 was made from 0.78 mm thick cold rolled steel and from a strip having a total length of about 39.67 mm, and a width of about 5 mm. The laterally extending portions 45, 46 were each about 18.31 mm long and separated at the adjacent ends 47, 48 thereof by a distance of about 3.05 mm. In other words, the connecting segment 49 extends about 3.05 mm in length between the laterally extending portions 46, 47. The connecting segment 49 is generally circular in shape (except for the tabs that extend to and interconnect with the laterally extending portions) and has an overall diameter of about 2.77 mm. In addition, the connecting segment 49 has a locating hole 51 in the center thereof with a diameter of about 1 mm. When the tube sector adapter is folded and formed as shown in FIG. 8, it has an overall length of about 19 mm. It will be noted from FIG. 6 that a solid outline has been presented as well as tapered phantom lines 52, 53, 54, and 56. These tapered lines represent the final outline configuration that may be more preferable for many applications. For example, when the blank 43 is formed, it may be preferable to shear the edges of the blank along the dotted lines 52, 53, 54, and 56. When the blank 43 is dimensioned as described above for use with a 3.17 mm diameter shaft, it is preferable to shear the blank along the illustrated phantom lines, with the triangular portion sheared off having a base dimension "B" of not more than about 5 mm. After the blank 43 is sheared to have tapered laterally extending portions as described, the blank is overformed to compensate for the springback that will occur as a result of the manufacturing process. Thus, the blank is formed to have a cylindrical internal surface that will closely fit the shaft with which it is to be assembled.

The blank 57 shown in FIG. 9 is formed from strip material about 0.78 mm thick and having a width of about 4.65 mm. The overall length of the blank 57 was about 60.3 mm overall, and it had a locating hole 58 in the connecting segment 59 with the diameter of the hole 58 being about 0.63 mm. When the tube sector adapter 57 is folded to be in the configuration shown in FIG. 11, it has an overall length of about 26.92 mm, and is of a size to adapt a 7.94 mm shaft to 9.52 mm.

With reference now to FIGS. 12-14, the blank 61 i formed from strip material of about 0.78 mm thick having an overall width of about 10.31 mm and an overall length of about 57.14 mm. The connecting segment 62 outlined with solid lines has a length of about 7.1 mm and a locating hole 63 having a diameter of 6.35 mm. Thus, the laterally extending segments 64, 65 were separated by a distance of about 7.1 mm represented by the connecting segment 62. Blank 61 also (like the blank 43 of FIG. 6) is sheared so that it is tapered with a triangular segment removed having a base "B" of about 0.76 mm to facilitate formation of the blank into the tube sector adapter 67 as shown in FIGS. 13 and 14. The tube sector adapter 67, as illustrated, is sized to adapt a shaft of 7.94 mm (5/16 in.) diameter to 9.52 mm (⅜ in.).

The dotted line construction represented by the phantom lines 70, 71 represents the form and shape of the blank that was used to provide the tube sector adapter 23 of FIGS. 1, 4, and 5, and discussed hereinabove. The only variation between the tube sector adapter 23 and tube sector adapter 67 was the difference in the connecting segments thereof, all as illustrated in FIGS. 12 and 13.

In each of the illustrated embodiments, the blanks were folded to establish interior corners at the closed end of the tube sector adapters. The interior radius at those corners is denoted by the reference character "R" in FIGS. 8, 11, and 14. In the prototypes that I have fabricated, I have found that making the radius R equal to about 0.5 mm has yielded satisfactory results and, although the exact mechanism which causes the surprising results discussed hereinbelow may not be fully explainable, it is not believed that the exact value of radius R is critical.

Use of the present invention as embodied in the illustrated constructions fulfills all of the objects spelled out hereinabove. Data is presented hereinbelow to give an indication of the ease with which the tube sector adapter 67 slipped onto a 7.94 mm (5/16 in.) motor shaft, slipped off manually, and yet was interlocked on the shaft when desired.

The test to be described was performed by slipping a bearing onto the test motor shaft and then loosely starting a hand made prototype tube sector adapter (sized and shaped to correspond to adapter 67 of FIGS. 13 and 14) on the shaft. Thereafter, a Spring Scale Model L-20 as sold by the Hunter Spring Company of Lansdale, Pa. was used to determine the forces required to push the tube sector adapter to a fully seated position on the shaft, and then the force required to remove it from the shaft.

When measuring the forces required to seat the adapter, the hand held spring scale was pushed straight against the connecting segment 62 at the hole 63. However, for removal, a string was tied at the ends thereof to diametrically opposite sides of the previously positioned bearing, the scale was hooked to the midpoint of the string outboard of the adapter, and then manually pulled until the adapter released from the shaft.

The test procedure will now be described in conjunction with FIGS. 15-17, which represent various relative positions of the adapter 62 and test motor shaft 78 during the test.

Initially, while sliding the adapter 67 onto the shaft, I found that a 0.18 kg (0.4 lb.) force slid the adapter onto the shaft until the distance to bottom (denoted by "d" in FIG. 15) was about 6.4 mm. At 6.4 mm, an increase in force to a level of about 0.27 kg. (0.6 lb.) was noted, with the force required for continued movement increasing as the connecting segment 63 moved closer to the end 79 of the shaft 78.

Specific force and corresponding distance "d" values were as follows: a force of 0.32 kg (0.7 lb.) when d was 4.8 mm; a force of 0.45 kg (1.0 lb.) when d was 3.2 mm; a force of 0.63 kg (1.4 lb.) when d was about 0.8 mm; a force of 0.68 kg (1.5 lb.) when d was about 0.5 mm; a force of 0.82 kg (1.8 lb.) just before the adapter bottomed, as shown in FIG. 16; and a force of 1.0 kg (2.2 lb.) to cause the adapter 62 to fully bottom against the shaft end 79. Thereafter, the adapter was removed from the shaft eight different times and the average amount of force required to remove the adapter was about 1.04 kg (2.3 lbs.).

It will be understood from the above data that the adapter 62 readily slipped onto the shaft but apparently gripped the shaft with increasing force as it approached the fully bottomed condition, and became interlocked with the shaft sufficiently tightly to prevent inadvertent dislodgement therefrom. However, the adapter was still easily removed from the shaft when desired. Also as will be understood, the connecting segment 63 positively located the adapter on the shaft.

While conducting vibration transmission tests as described in my previously identified copending application Ser. No. 840,263, I determined that low vibration transmission from a motor to a mounting structure may depend upon the fit of a blower wheel hub to a shaft/shaft adapter. During tests for vibration characteristics as described in my above-referenced application, I mounted a spring adapter (as described hereinabove) on a motor with a 7.93 mm shaft and conducted vibration transmission tests. Similar tests were also conducted with the same motor, blower wheel, and mounting arrangement, but with a tubular segment adapter embodying the present invention. I found that the transmitted vibrations were reduced by one half when the adapter embodying the present invention was used.

When tube sector adapters are manufactured by following my preferred methods, I select flat strip material and stamp it to form an elongate flat structure with a locating hole preferably formed in the center of a connecting section of the blank. Thereafter, simple fixturing is used to locate the blank with a pin that fits in the locating hole, and to fold the blank so that it will have two laterally extending legs which extend in cantilever fashion from the central connecting segment. The laterally extending legs are formed (after they have been bent) to establish longitudinally extending curved interior leg surfaces. The curvature of these surfaces is made to correspond to the curvature of a predetermined shaft diameter with which the tubular sector shaft adapter is to be used. When the shaft adapter is to have the configuration as illustrated in FIG. 7 (or at the left side of FIG. 13) with the longitudinally extending marginal edges of the legs being relatively close to one another in their final configuration, it is also preferable to establish tapered marginal edges for the laterally extending legs so that the legs may be at least slightly overbent or overformed during the manufacturing process to insure that the free or distal ends of the laterally extending legs will closely embrace a shaft after it has been assembled therewith.

Preferably, a tubular sector adapter embodying the present invention and a motor shaft are assembled together by sliding the free ends of the laterally extending segments or legs of the adapter onto the end of the motor shaft. Thereafter, the shaft and the adapter are relatively moved with the laterally extending legs (or segments) sliding along the shaft with the interior curved surfaces thereof closely embracing the shaft. It is presently believed that the assembly process stresses the tubular adapter at least slightly during the assembly process so that, as the connecting segment of the adapter bottoms against the end of the shaft, the stresses within the adapter cause the adapter to grip the shaft with sufficient force to prevent inadvertent separation of the adapter and the shaft. However, the stressing of the adapter and the gripping forces are such (when adapters are manufactured as taught herein) that easy manual removal of the adapter from the shaft may be accomplished.

When adapters embodying the invention are assembled on a shaft having a flat, the slit or passageway established between adjacent marginal edges of the extending legs are aligned on the shaft so that the marginal edges of the laterally extending legs accommodate the flat on the shaft and establish a passageway through which a fastener may be moved into contact with the shaft.

While I have now shown and described preferred and alternate embodiments of my invention and methods of making and using the same; the disclosure contained herein should be construed as being exemplary in nature. The invention itself, therefore, should be construed to be limited only by the scope of the claims that are appended hereto and that form part of my disclosure.

What I claim as new and desire to secure by Letters Patent of the United States is:

1. An adapted shaft motor comprising a stator assembly, a rotor assembly including a shaft of a predetermined diameter and having at least one round end extending from the stator assembly for connection to a driven device having a bore greater than said predetermined diameter, and an adapter positively interlocked with the shaft and positively located on the at least one end of the shaft; said adapter comprising a tube sector having a connecting segment bottomed against the end of the shaft, and first and second laterally extending segments that extend along the shaft in cantilever fashion from the connecting segment; said laterally extending segments each having a continuous smooth shaft embracing interior surface with a curvature corresponding substantially throughout to the curvature of the shaft; said laterally extending segments having adjacent continuous edges thereof spaced from one another to establish a fastener accommodating passageway that extends to the free ends of the laterally extending segments whereby a burr raised on the shaft due to a fastener will not interfere with removal of the tube sector from the shaft; and said tube sector gripping the shaft with sufficient force to prevent inadvertent removal of the tube sector from the shaft and yet so that the tube sector may be readily manually removed from the shaft, said connecting segment limiting movement of the adapter on the shaft.

2. A tube sector adapter comprising: a connecting segment and at least two laterally extending legs interconnected by the connecting segment; said laterally extending legs each having an internal continuous curved surface corresponding substantially throughout to the curvature of a predetermined shaft diameter; said tube sector adapter being formed so that it will easily slide manually along a shaft of the predetermined diameter until the connecting segment bottoms against the shaft to limit further movement therealong; said legs extending from the connecting segment in cantilever fashion and being interconnected with one another solely by the connecting segment along sections of bent material having an interior bend radius of not more than about one half of a millimeter, whereby said legs are adapted to grip the shaft to prevent inadvertent removal therefrom and yet to permit manual removal of the adapter from the shaft.

3. A new and improved motor shaft adapter in the form of a tubular sector adapted to positively interlock with a shaft to prevent inadvertent removal therefrom but which may be manually slipped on and off a shaft; said adapter comprising first and second laterally extending segments cantilevered from a central connecting segment and each having a continuous shaft embracing concave interior surface of a curvature corresponding substantially throughout to the curvature of a predetermined diameter shaft; said laterally extending segments each having a pair of continuous longitudinally extending marginal edges, at least one of said continuous edges facing the corresponding edge of the other one of said laterally extending segments to define a fastener accommodating passageway therebetween extending to the free ends of said laterally extending segments, said edges being tapered to continuously widen said passageway in a direction away from said connecting segment so as to permit initial overforming of said tubular sector; the junction between said laterally extending segments and said central connecting segment having an interior bend radius of not more than about one half of a millimeter so that the curved interior surfaces of the laterally extending segments will closely embrace a shaft and whereby said segments are adapted to prevent inadvertent removal from such shaft and yet permit manual removal therefrom.

* * * * *